(12) United States Patent
Roetker (10) Patent No.: US 11,459,689 B2
(45) Date of Patent: Oct. 4, 2022

(54) MOTOR ASSEMBLY FOR A WASHING MACHINE APPLIANCE

(71) Applicant: Haier US Appliance Solutions, Inc., Wilmington, DE (US)

(72) Inventor: John Joseph Roetker, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 0 days.

(21) Appl. No.: 16/952,822

(22) Filed: Nov. 19, 2020

(65) Prior Publication Data

US 2022/0154383 A1 May 19, 2022

(51) Int. Cl.
| | |
|---|---|
| D06F 37/30 | (2020.01) |
| D06F 23/04 | (2006.01) |
| D06F 39/12 | (2006.01) |
| F04D 29/70 | (2006.01) |
| F04D 29/28 | (2006.01) |
| F16H 57/02 | (2012.01) |
| F16H 7/02 | (2006.01) |
| F16H 57/04 | (2010.01) |
| F16H 57/035 | (2012.01) |

(52) U.S. Cl.
CPC ............ *D06F 37/304* (2013.01); *D06F 23/04* (2013.01); *D06F 39/12* (2013.01); *F04D 29/281* (2013.01); *F04D 29/703* (2013.01); *F16H 7/02* (2013.01); *F16H 57/035* (2013.01); *F16H 57/0416* (2013.01); *F16H 2057/02069* (2013.01)

(58) Field of Classification Search
None
See application file for complete search history.

(56) References Cited

U.S. PATENT DOCUMENTS 3,379,007 A * 4/1968 Brundage ............ D06F 37/308
60/423
4,167,683 A 9/1979 Hallerbäck et al.
(Continued)

FOREIGN PATENT DOCUMENTS

CN 103668909 A 3/2014
CN 104295526 A 1/2015
(Continued)

OTHER PUBLICATIONS

Espacenet translation FR2745440, Motor vehicle alternator angled airvent, Valeo Equip, Bruno (Year: 1997).*

*Primary Examiner* — Cristi J Tate-Sims
(74) *Attorney, Agent, or Firm* — Dority & Manning, P.A.

(57) ABSTRACT

A washing machine appliance includes a wash basket rotatably mounted within a wash tub for receiving of a load of articles for washing and a drive motor having a motor shaft for selectively rotating the wash basket and an agitation element. A cooling fan is mechanically coupled to the motor shaft for urging a flow of air as the drive motor rotates the motor shaft and a fan cover is positioned over the cooling fan. The fan cover includes an endcap positioned opposite the cooling fan relative to the drive motor along an axial direction, a peripheral portion defining a plurality of ventilation openings spaced apart along a circumferential direction, and a plurality of louvers positioned over the plurality of ventilation openings for directing the flow of air away from the drive motor.

18 Claims, 6 Drawing Sheets

(56) References Cited

U.S. PATENT DOCUMENTS

2005/0076455 A1* 4/2005 Guinibert ............... D06F 34/20
                                                                                          68/3 R
2014/0377071 A1* 12/2014 Kim ....................... F04D 29/30
                                                                                          416/185

FOREIGN PATENT DOCUMENTS

FR            2745440 A1    8/1997
KR   2003/0019710 A    3/2003

* cited by examiner

MOTOR ASSEMBLY FOR A WASHING MACHINE APPLIANCE

FIELD OF THE INVENTION

The present subject matter relates generally to washing machine appliances, and more particularly to motor assemblies for washing machine appliances.

BACKGROUND OF THE INVENTION

Washing machine appliances generally include a wash tub for containing water or wash fluid, e.g., water and detergent, bleach, and/or other wash additives. A wash basket is rotatably mounted within the wash tub and defines a wash chamber for receipt of articles for washing, and an agitation element is rotatably mounted within the wash basket. Washing machine appliances are typically equipped to operate in one or more modes or cycles, such as wash, rinse, and spin cycles. For example, during a wash or rinse cycle, the wash fluid is directed into the wash tub in order to wash and/or rinse articles within the wash chamber. In addition, the wash basket and/or the agitation element can rotate at various speeds to agitate or impart motion to articles within the wash chamber, to wring wash fluid from the articles, etc.

To facilitate rotation of the wash basket during the various operating cycles, conventional washing machine appliances include a motor assembly that is mechanically coupled to the wash basket. Notably, the performance of conventional operating cycles may be limited due to temperature restrictions related to drive motor or other components of the motor assembly. In this regard, conventional motor assemblies typically generate significant heat during operation, necessitating the implementation of cool-down periods, performance of cycles at reduced speeds, or other heat mitigation steps or procedures.

Accordingly, a washing machine appliance including features for improved and prolonged operation of a motor assembly would be useful. More specifically, a motor assembly for a washing machine appliance that includes integral features for facilitating the cooling of the motor, e.g., to maximize the operating envelope of the motor without requiring costly heat mitigation techniques, would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a washing machine appliance is provided including a wash tub positioned within a cabinet and defining a wash chamber, a wash basket rotatably mounted within the wash tub for receiving of a load of articles for washing, an agitation element rotatably mounted within the wash basket, a drive motor having a motor shaft defining an axial direction and being operably coupled to the wash basket and the agitation element for selectively rotating the wash basket and the agitation element, a cooling fan mechanically coupled to the motor shaft for urging a flow of air as the drive motor rotates the motor shaft, and a fan cover positioned over the cooling fan. The fan cover includes an endcap positioned opposite the cooling fan relative to the drive motor along the axial direction, a peripheral portion defining a plurality of ventilation openings spaced apart along a circumferential direction, and a plurality of louvers positioned over the plurality of ventilation openings for directing the flow of air away from the drive motor.

In another exemplary embodiment, a fan cover for a washing machine appliance is provided. The washing machine appliance includes a wash basket rotatably mounted within a wash tub, an agitation element rotatably mounted within the wash basket, a drive motor having a motor shaft defining an axial direction and being operably coupled to the wash basket and the agitation element for selectively rotating the wash basket and the agitation element, and a cooling fan mechanically coupled to the motor shaft for urging a flow of air as the drive motor rotates the motor shaft. The fan cover includes an endcap positioned opposite the cooling fan relative to the drive motor along the axial direction, a peripheral portion defining a plurality of ventilation openings spaced apart along a circumferential direction, and a plurality of louvers positioned over the plurality of ventilation openings for directing the flow of air away from the drive motor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 1:
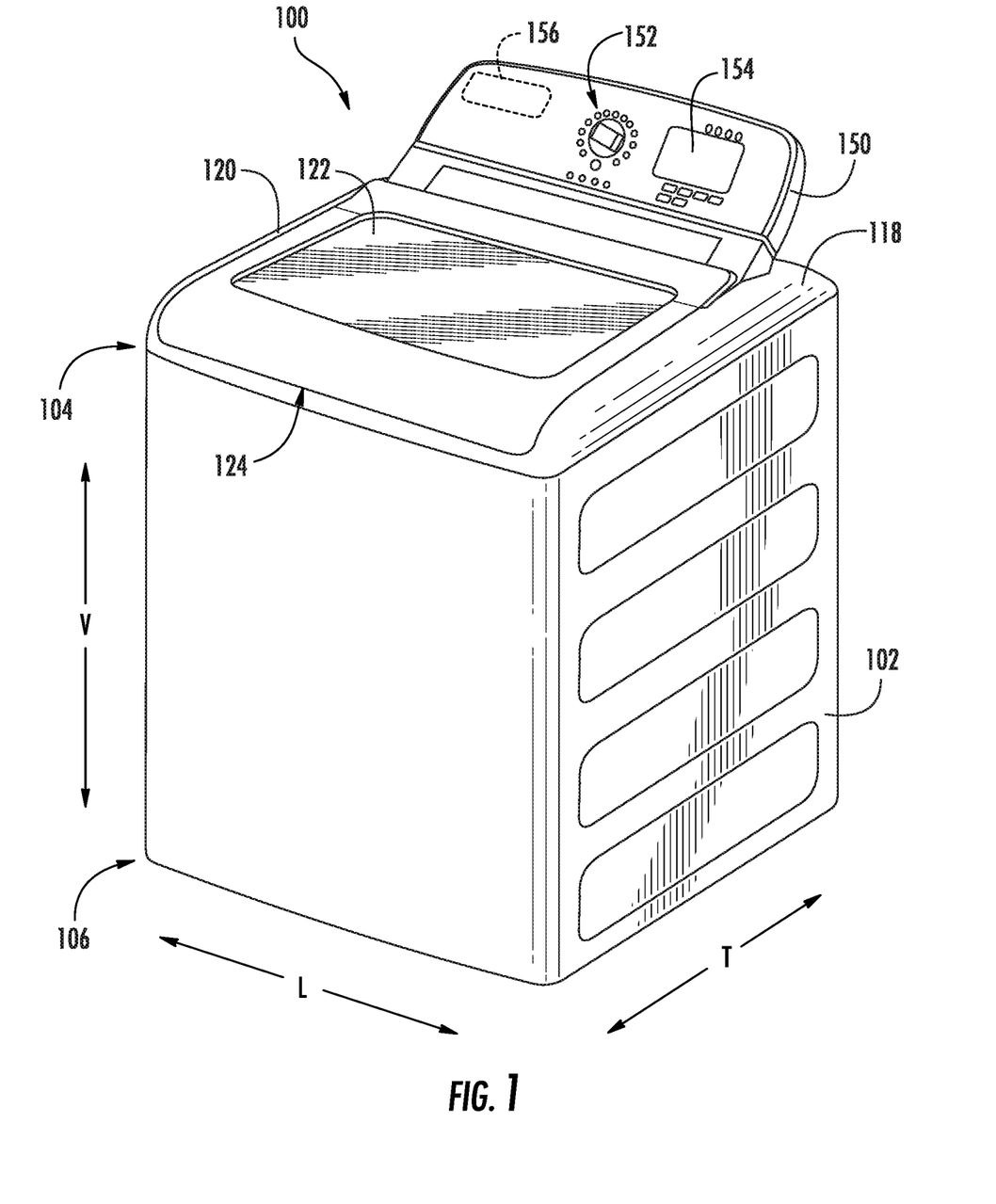
FIG. 1 provides a perspective view of a washing machine appliance according to an exemplary embodiment of the present subject matter with a door of the exemplary washing machine appliance shown in a closed position.
Figure 2:
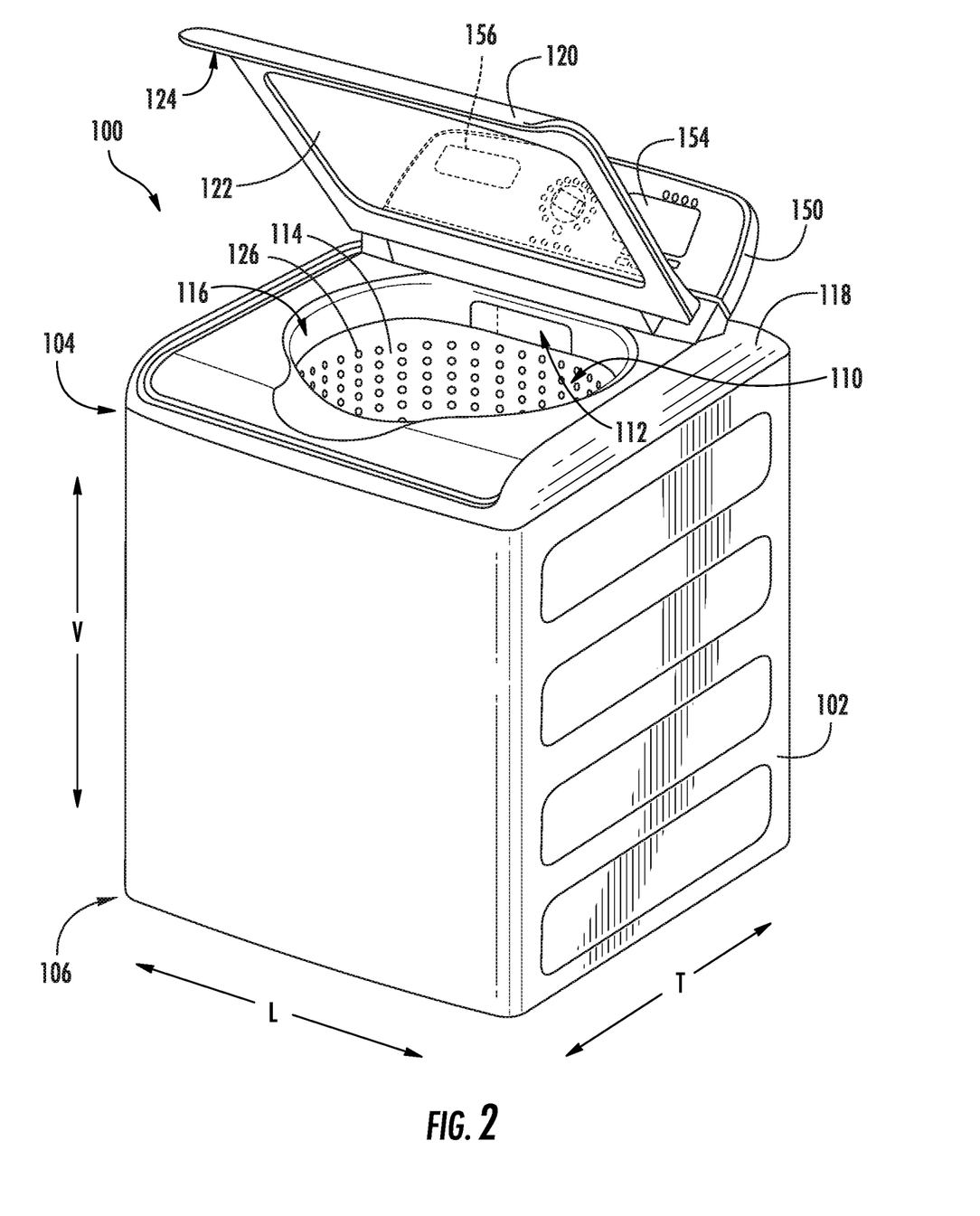
FIG. 2 provides a perspective view of the exemplary washing machine appliance of FIG. 1 with the door of the exemplary washing machine appliance shown in an open position.
Figure 3:
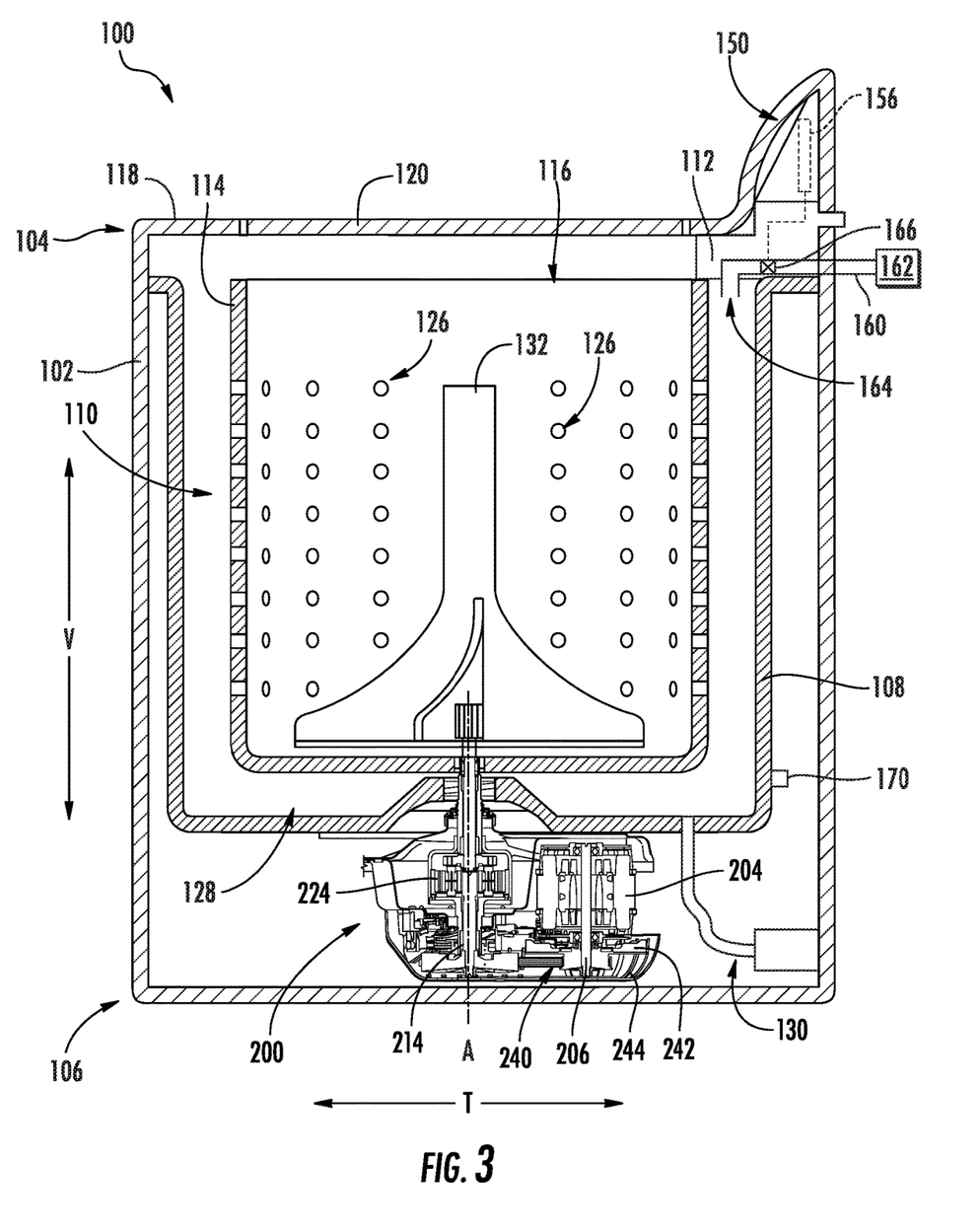
FIG. 3 provides a side cross-sectional view of the exemplary washing machine appliance of FIG. 1.

FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 100, it should be appreciated that vertical axis washing machine appliance 100 is provided by way of example only. It will be understood that aspects of the present subject matter may be used in any other suitable washing machine appliance, such as a horizontal axis washing machine appliance. Indeed, modifications and variations may be made to washing machine appliance 100, including different configurations, different appearances, and/or different features while remaining within the scope of the present subject matter.

Washing machine appliance 100 has a cabinet 102 that extends between a top portion 104 and a bottom portion 106 along the vertical direction V, between a first side (left) and a second side (right) along the lateral direction L, and between a front and a rear along the transverse direction T. As best shown in FIG. 3, a wash tub 108 is positioned within cabinet 102, defines a wash chamber 110, and is generally configured for retaining wash fluids during an operating cycle. Washing machine appliance 100 further includes a primary dispenser 112 (FIG. 2) for dispensing wash fluid into wash tub 108. The term "wash fluid" refers to a liquid used for washing and/or rinsing articles during an operating cycle and may include any combination of water, detergent, fabric softener, bleach, and other wash additives or treatments.

In addition, washing machine appliance 100 includes a wash basket 114 that is positioned within wash tub 108 and generally defines an opening 116 for receipt of articles for washing. More specifically, wash basket 114 is rotatably mounted within wash tub 108 such that it is rotatable about an axis of rotation A. According to the illustrated embodiment, the axis of rotation A is substantially parallel to the vertical direction V. In this regard, washing machine appliance 100 is generally referred to as a "vertical axis" or "top load" washing machine appliance 100. However, it should be appreciated that aspects of the present subject matter may be used within the context of a horizontal axis or front load washing machine appliance as well.

As illustrated, cabinet 102 of washing machine appliance 100 has a top panel 118. Top panel 118 defines an opening (FIG. 2) that coincides with opening 116 of wash basket 114 to permit a user access to wash basket 114. Washing machine appliance 100 further includes a door 120 which is rotatably mounted to top panel 118 to permit selective access to opening 116. In particular, door 120 selectively rotates between the closed position (as shown in FIGS. 1 and 3) and the open position (as shown in FIG. 2). In the closed position, door 120 inhibits access to wash basket 114. Conversely, in the open position, a user can access wash basket 114. A window 122 in door 120 permits viewing of wash basket 114 when door 120 is in the closed position, e.g., during operation of washing machine appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIGS. 2 and 3, wash basket 114 further defines a plurality of perforations 126 to facilitate fluid communication between an interior of wash basket 114 and wash tub 108. In this regard, wash basket 114 is spaced apart from wash tub 108 to define a space for wash fluid to escape wash chamber 110. During a spin cycle, wash fluid within articles of clothing and within wash chamber 110 is urged through perforations 126 wherein it may collect in a sump 128 defined by wash tub 108. Washing machine appliance 100 further includes a pump assembly 130 (FIG. 3) that is located beneath wash tub 108 and wash basket 114 for gravity assisted flow when draining wash tub 108.

An impeller or agitation element 132 (FIG. 3), such as a vane agitator, impeller, auger, oscillatory basket mechanism, or some combination thereof is disposed in wash basket 114 to impart an oscillatory motion to articles and liquid in wash basket 114. More specifically, agitation element 132 extends into wash basket 114 and assists agitation of articles disposed within wash basket 114 during operation of washing machine appliance 100, e.g., to facilitate improved cleaning. In different embodiments, agitation element 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitation element 132 and wash basket 114 are oriented to rotate about axis of rotation A (which is substantially parallel to vertical direction V).

As best illustrated in FIG. 3, washing machine appliance 100 includes a motor assembly 200 (described in detail below) in mechanical communication with wash basket 114 to selectively rotate wash basket 114 (e.g., during an agitation or a rinse cycle of washing machine appliance 100). In addition, motor assembly 200 may also be in mechanical communication with agitation element 132. In this manner, motor assembly 200 may be configured for selectively rotating or oscillating wash basket 114 and/or agitation element 132 during various operating cycles of washing machine appliance 100.

Referring still to FIGS. 1 through 3, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, and/or other items of interest to appliance users regarding operation.

Operation of washing machine appliance 100 is controlled by a controller or processing device 156 that is operatively coupled to control panel 150 for user manipulation to select washing machine cycles and features. In response to user manipulation of control panel 150, controller 156 operates the various components of washing machine appliance 100 to execute selected machine cycles and features. According to an exemplary embodiment, controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of washing machine appliance 100 may be in communication with controller 156 via one or more signal lines or shared communication busses.

During operation of washing machine appliance 100, laundry items are loaded into wash basket 114 through opening 116, and washing operation is initiated through operator manipulation of input selectors 152. Wash basket 114 is filled with water and detergent and/or other fluid additives via primary dispenser 112. One or more valves can be controlled by washing machine appliance 100 to provide for filling wash tub 108 and wash basket 114 to the appropriate level for the amount of articles being washed and/or rinsed. By way of example for a wash mode, once wash basket 114 is properly filled with fluid, the contents of wash basket 114 can be agitated (e.g., with agitation element 132 as discussed previously) for washing of laundry items in wash basket 114.

More specifically, referring again to FIG. 3, a water fill process will be described according to an exemplary embodiment. As illustrated, washing machine appliance 100 includes a water supply conduit 160 that provides fluid communication between a water supply source 162 (such as a municipal water supply) and a discharge nozzle 164 for directing a flow of water into wash chamber 110. In addition, washing machine appliance 100 includes a water fill valve or water control valve 166 which is operably coupled to water supply conduit 160 and communicatively coupled to controller 156. In this manner, controller 156 may regulate the operation of water control valve 166 to regulate the amount of water within wash tub 108. In addition, washing machine appliance 100 may include one or more pressure sensors 170 for detecting the amount of water and or clothes within wash tub 108. For example, pressure sensor 170 may be operably coupled to a side of tub 108 for detecting the weight of wash tub 108, which controller 156 may use to determine a volume of water in wash chamber 110 and a subwasher load weight.

After wash tub 108 is filled and the agitation phase of the wash cycle is completed, wash basket 114 can be drained, e.g., by drain pump assembly 130. Laundry articles can then be rinsed by again adding fluid to wash basket 114 depending on the specifics of the cleaning cycle selected by a user. The impeller or agitation element 132 may again provide agitation within wash basket 114. One or more spin cycles may also be used as part of the cleaning process. In particular, a spin cycle may be applied after the wash cycle and/or after the rinse cycle in order to wring wash fluid from the articles being washed. During a spin cycle, wash basket 114 is rotated at relatively high speeds to help wring fluid from the laundry articles through perforations 126. After articles disposed in wash basket 114 are cleaned and/or washed, the user can remove the articles from wash basket 114, e.g., by reaching into wash basket 114 through opening 116.

Figure 4:
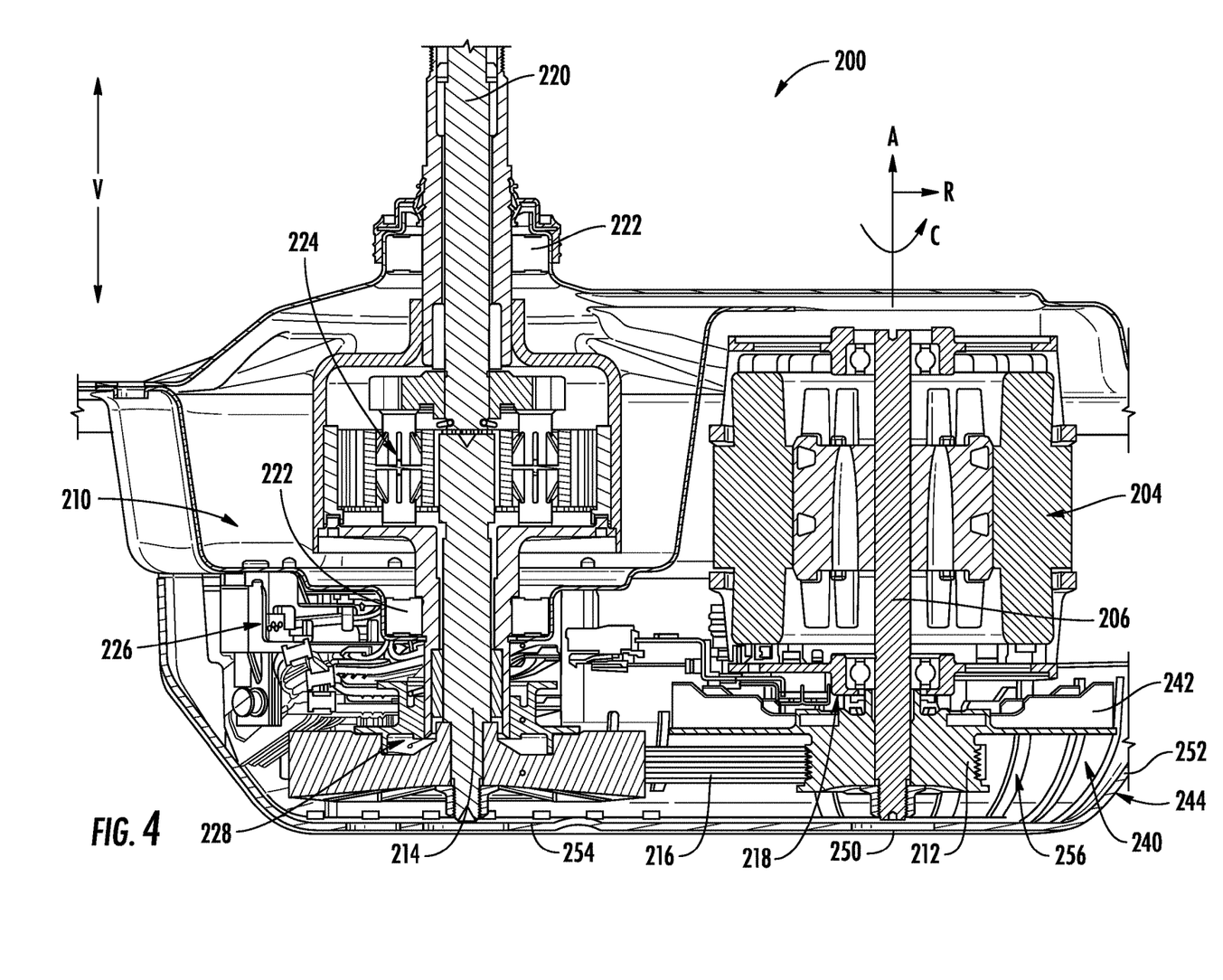
FIG. 4 provides a cross-sectional view of a motor assembly that may be used with the exemplary washing machine appliance of FIG. 1 according to an exemplary embodiment of the present subject matter.

Referring now to FIGS. 3 and 4, a motor assembly 200 will be described according to an exemplary embodiment of the present subject matter. Motor assembly 200 may be used with washing machine appliance 100, e.g., to facilitate rotation of wash basket 114 and/or agitation element 132, as described above. In addition, motor assembly 200 may be used in other washing machine appliances, including both vertical and horizontal axis washing machine appliances. As described in detail below, motor assembly 200 includes features for rotating wash basket 114 while also generating a flow of cooling air (e.g., identified schematically in FIGS. 6 and 7 by reference numeral 202) to help reduce the operating temperature of motor assembly 200, thereby expanding its overall operating envelope and performance capabilities. It should be appreciated that motor assembly 200 described herein is only an exemplary embodiment used to describe aspects of the present subject matter and is not intended to limit the scope of the present disclosure in any manner.

As shown, motor assembly 200 generally includes a drive motor 204 that is operably coupled to wash basket 114 for selectively rotating wash basket 114. More specifically, for example, drive motor 204 may include a motor shaft 206 that defines an axial direction A, a radial direction R, and a circumferential direction C. According to the exemplary embodiment, drive motor 204 is a vertically oriented, e.g., such that motor shaft 206 extends parallel to the vertical direction V of washing machine appliance 100 (i.e., such that axial direction A is parallel to the vertical direction V). However, it should be appreciated that aspects of the present subject matter may apply to any other suitable motor arrangement, e.g., such as a horizontally mounted motor assembly for a front load washing machine appliance.

As used herein, "motor" may refer to any suitable drive motor and/or transmission assembly for rotating wash basket 114. For example, drive motor 204 may be a brushless DC electric motor, a stepper motor, or any other suitable type or configuration of motor. For example, drive motor 204 may be an AC motor, an induction motor, a permanent magnet synchronous motor, or any other suitable type of AC motor. In addition, drive motor 204 may include any suitable transmission assemblies, clutch mechanisms, or other components. According to an exemplary embodiment, drive motor 204 may be operably coupled to controller 156, which is programmed to rotate wash basket 114 according to predetermined operating cycles, based on user inputs (e.g. via control panel 150 or input selectors 152), etc.

Motor assembly 200 may further include a transmission assembly 210 that is operably coupled to wash basket 114 and/or agitation element 132 for transmitting torque from motor shaft 206. In general, transmission assembly 210 may be any suitable mechanism or device suitable for utilizing the rotational motion of motor shaft 206 to rotate wash basket 114 and/or agitation element 132. Accordingly, aspects of the present subject matter are not limited to the specific transmission assembly 210 described herein according to an exemplary embodiment.

Specifically, as best shown in FIG. 4, transmission assembly 210 is a belt driven transmission. In this regard, transmission assembly 210 includes a drive pulley 212 that is directly mechanically coupled to motor shaft 206. Drive pulley 212 is generally configured for transmitting torque to an input shaft 214 of transmission assembly 210 via a drive belt 216. As shown, input shaft 214 and motor shaft 206 are both vertically oriented in parallel to each other. In addition, motor shaft 206 and drive pulley 212 both extend out of a bottom surface 218 of drive motor 204 and input shaft 214 extends from a bottom of wash basket 114 to a location proximate bottom 106 of cabinet 102. However, it should be appreciated that according to alternative embodiments, any other suitable motor and transmission configuration may be used.

Referring still to FIG. 4, input shaft 214 may be mechanically coupled to an output shaft 220 that is coupled to wash basket 114 and/or agitation element 132. More specifically, as shown, input shaft 214 and output shaft 220 are rotatably supported by one or more bearings 222 and are mechanically coupled through a gearbox 224, a mode shifter 226, and a clutch 228. In general, gearbox 224 includes a plurality of gears encased in a housing for altering the torque and/or speed transmitted from input shaft 214 to output shaft 220. In addition, mode shifter 226 may be any suitable mechanism, gear train, etc. that is generally configured for adjusting the rotating action of output shaft 220, e.g., to facilitate various agitation profiles or programs depending on the operating cycle of washing machine appliance 100. Clutch 228 may be any suitable device for selectively engaging or disengaging input shaft 214 and output shaft 220, e.g., for engaging and disengaging wash basket 114 and/or agitation element 132.

Notably, motor assembly 200 and transmission assembly 210 may operate together to facilitate multiple modes of operation of washing machine appliance 100. For example, during a wash cycle or an agitation cycle, wash basket 114 may remain stationary and agitation element 132 may oscillate back and forth according to any suitable agitation profile. This may be achieved, for example, by disengaging mode shifter 226 and/or clutch 228 to mechanically decouple wash basket 114 from drive belt 216 while operating drive motor 204 in a bi-directional, oscillating manner. By contrast, during a drain cycle or a spin cycle, wash basket 114 and agitation element 132 may rotate in the same direction at high speeds. This may be achieved, for example, by engaging mode shifter 226 and/or clutch 228 to mechanically couple wash basket 114 to drive belt 216 while operating drive motor 204 in a single direction. It should be appreciated that other modes of operating, along with other means for transmitting torque from motor assembly 200 may be used while remaining within the scope of the present subject matter.

Notably, operation of drive motor 204 generates heat within cabinet 102. If this heat exceeds certain thresholds and is not discharged away from drive motor 204, the operating limits of drive motor 204 may result in restrictions on the performance capabilities and operating envelope of motor assembly 200. As a result, aspects of the present subject matter are directed to systems and features for facilitating cooling of motor assembly 200, e.g., thereby facilitating improved performance of motor assembly 200 and washing machine appliance 100.

Specifically, according to exemplary embodiments of the present subject matter, washing machine appliance 100 may include a fan assembly 240 that is generally configured for cooling drive motor 204 during operation of washing machine appliance 100. More specifically, referring still to FIG. 4, fan assembly 240 may generally include a cooling fan 242 that is mechanically coupled to motor shaft 206 for urging a flow of cooling air around drive motor 204 as it rotates motor shaft 206. In addition, fan assembly 240 may include a fan housing or a fan cover 244 that is positioned over cooling fan 242 and is generally configured for preventing access to moving parts of drive motor 204 and/or fan assembly 240. Each of these features of fan assembly 240 will be described in more detail below according to exemplary embodiments of the present subject matter.

In general, cooling fan 242 may generally be any suitable type and configuration of fan or other air moving device. For example, cooling fan 242 is illustrated as a centrifugal fan directly coupled to motor shaft 206 such that it rotates about the axial direction A. However, according to alternative embodiments, cooling fans 242 may be a tangential fan, an axial fan, or any other suitable air blower. Notably, regardless of the type and configuration of fan used, the space available within cabinet 102 for positioning and rotating cooling fan 242 is very limited. Therefore, aspects of the present subject matter are directed to unique designs of fan assembly 240 to facilitate improved cooling of the motor assembly 200 during operation.

Figure 5:
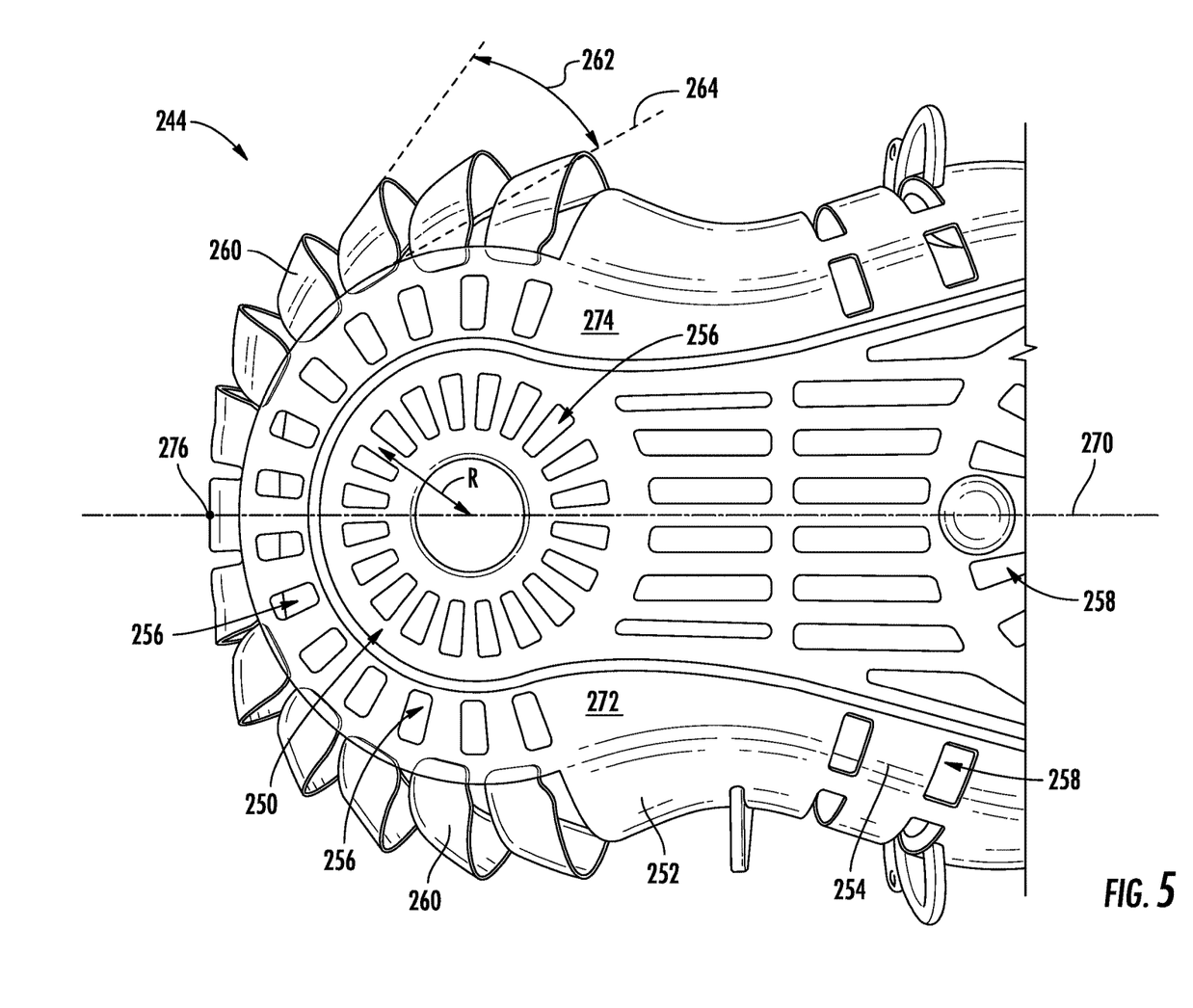
FIG. 5 provides a perspective view of a fan cover of the exemplary motor assembly of FIG. 4 according to an exemplary embodiment of the present subject matter.
Figure 6:
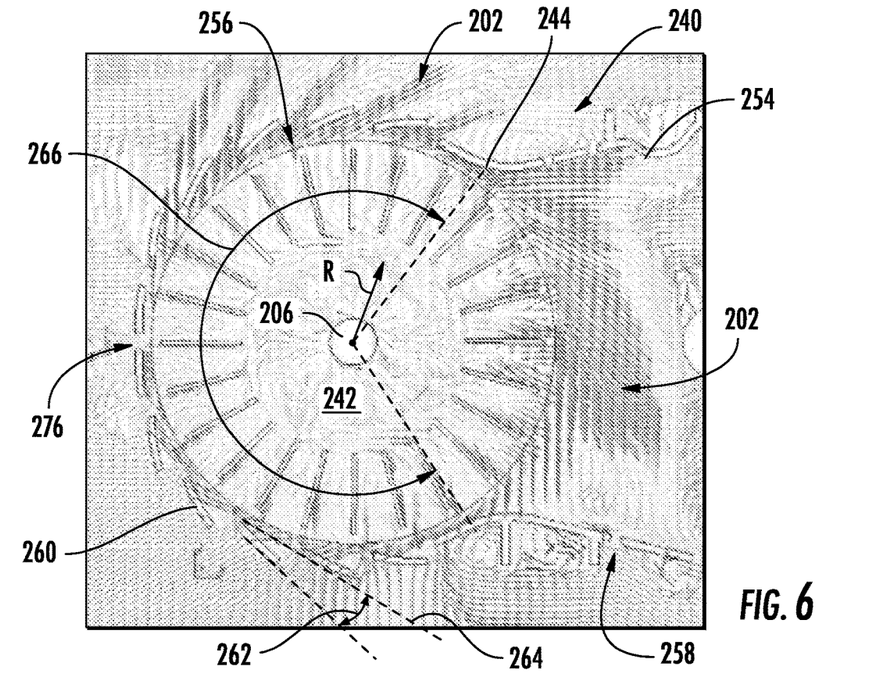
FIG. 6 provides a top view of the exemplary motor assembly of FIG. 4 discharging heated air in a computational fluid dynamics model while rotating in the clockwise direction according to an exemplary embodiment of the present subject matter.
Figure 7:
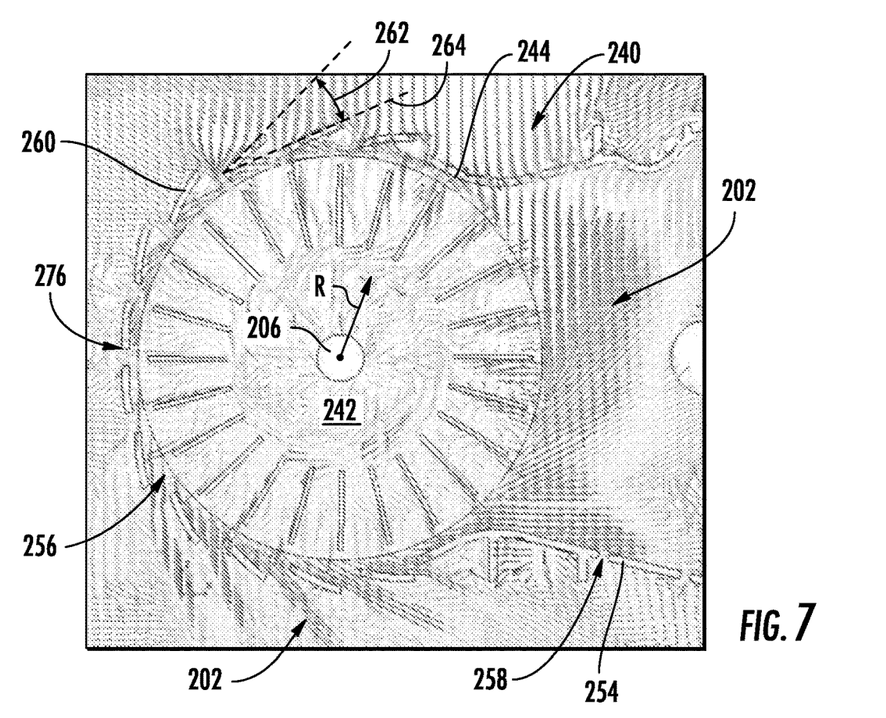
FIG. 7 provides a top view of the exemplary motor assembly of FIG. 4 discharging heated air in a computational fluid dynamics model while rotating in the counter clockwise direction according to an exemplary embodiment of the present subject matter.

Referring now also to FIGS. 5 through 7, fan cover 244 will be described in more detail according to an exemplary embodiment of the present subject matter. As shown, fan cover 244 generally includes an endcap 250 that is positioned opposite cooling fan 242 relative to drive motor 204 along the axial direction A. In other words, endcap 250 is generally a flat portion of fan cover 244 and cooling fan 242 is sandwiched between drive motor 204 and endcap 250. Fan cover 244 further includes a peripheral portion 252 that extends from endcap 250 and wraps around a radial tip of cooling fan 242, e.g., to prevent user access to moving parts of drive motor 204 or cooling fan 242 during operation.

According to the illustrated embodiment, fan cover 244 is designed not only to cover cooling fan 242, but also to cover other portions of transmission assembly 210. In this regard, for example, fan cover 244 may further define a belt cover 254 that extends from fan cover 244 is positioned over drive belt 216, mode shifter 226, clutch 228, etc. Notably, to facilitate the discharge of air flow 202 generated by cooling fan 242, fan cover 244 and belt cover 254 may define a plurality of apertures. Specifically, according to the illustrated embodiment, fan cover 244 may define a plurality of ventilation apertures 256 and belt cover 254 may define a plurality of belt cover apertures 258 for passing the flow of cooling air. In general, fan cover 244 and belt cover 254 may define any suitable number, type, geometry, size, and configuration of apertures 256, 258 for facilitating improved airflow from fan assembly 240.

For example, according to the illustrated embodiment, a plurality of smaller ventilation apertures 256 may be spaced in a circular pattern on endcap 250, e.g., surrounding motor shaft 206. Moreover, according to an exemplary embodiment, the overall size of ventilation apertures 256 may increase progressively from a central axis of motor shaft 206 or the axial direction A toward peripheral portion 252. According to the illustrated embodiment, peripheral portion 252 defines a plurality of ventilation apertures 256 that are spaced apart along the circumferential direction C.

Moreover, according to the illustrated embodiment, fan cover 244 may further include a plurality of louvers 260 that are positioned over the plurality of ventilation apertures 256 for directing the flow of air 202 away from drive motor 204. Specifically, according to the illustrated embodiment, louvers 260 are positioned over ventilation apertures 256 defined on peripheral portion 252. As will be described in more detail below, the size, angular orientation, geometry, and angle magnitude may vary from louver to louver 260 to facilitate improved discharge of heated air 202 and improved performance of fan assembly 240.

According to the exemplary embodiment described herein, louvers 260 are bidirectional such that a portion of louvers 260 positioned on one end of peripheral portion 252 are oriented in one direction (e.g., in a clockwise orientation) while louvers 260 positioned on the other end of peripheral portion 252 are oriented in the other direction (e.g., in a counterclockwise orientation). Notably, this configuration may provide improved discharge of heated air as drive motor 204 cycles through the various modes of operation, some of which rotate clockwise and some of which rotate counterclockwise.

As best illustrated in FIGS. 6 and 7, each louver 260 may define an extension angle 262 that is measured relative to a tangent line 264 defined by fan cover 244 at a center of peripheral portion 252 (e.g., a center along the axial direction A) at the location of each respective louver 260. Notably, according to exemplary embodiments of the present subject matter, the extension angle 262 of louvers 260 may vary about the circumferential direction C in order to improve the operation of fan assembly 240. Thus, at least two of the louvers 260 define a different extension angle 262. According to still other embodiments, every louver 260 defines a different extension angle 262.

According to the illustrated embodiment, louvers 260 are only positioned over ventilation apertures 256 defined in peripheral portion 252. In addition, peripheral portion 244 merges into belt cover 254 such that peripheral portion 252 extends through an arc length 266 measured along the circumferential direction C before merging with belt cover 254. According to exemplary embodiments, arc length 266 is between about 195 and 315 degrees, between about 215 and 295 degrees, between about 235 and 275 degrees, about 255 degrees, or any other suitable arc length. However, it should be appreciated that according to alternative embodiments, peripheral portion 252 may define any suitable arc length 266 and louvers 260 may be defined over any other suitable ventilation apertures 256 and/or belt cover apertures 258.

According to exemplary embodiments of the present subject matter, the size, angle, and/or orientation of louvers 260 may vary at least in part based on their location on fan cover 244. In this manner, as described briefly above, the position of ventilation apertures 256 and the selective orientation of the louvers 260 with respect to the circumferential discharge region of fan assembly 240 directs the heated air 202 around drive motor 204 away from drive motor 204 resulting improved cooling during both the agitation and spin portions of the operating cycle. In this regard, for example, louvers 260 oriented in one direction might be more efficient at cooling drive motor 204 while rotating one direction (e.g., clockwise, as shown in FIG. 6) during an agitation cycle, while louvers 260 oriented in another direction might be more efficient at cooling drive motor 204 while rotating the opposite direction (e.g., counterclockwise as shown in FIG. 7) during a spin cycle. Exemplary positioning of ventilation apertures 260 and geometries of louvers 260 are provided below according to an exemplary embodiment. However, it should be appreciated the modifications may be made to these features while remaining within the scope of the present subject matter.

According to the illustrated embodiment, a transition line 270 is defined by fan cover 244 which divides fan cover 244 into a first portion 272 and a second portion 274. More specifically, as illustrated, transition line 270 divides fan cover 244 in half, such that first portion 272 is a mirror image of second portion 274. In addition, when viewed in plane defined perpendicular to the axial direction A, transition line 270 extends through motor shaft 206 and input shaft 214 and terminates at a transition point 276 at a distal end of transition line 270, i.e., at a point farthest away from input shaft 214. As such, transition line 270 also extends directly through a center of drive belt 216.

As shown, transition point 276 may be the point at which the directional orientation louvers 260 changes. In this regard, louvers 260 may be substantially flat or have an extension angle 262 of approximately 0 degrees at the transition point and their extension angle 262 may increase progressively from transition point 276 moving around along the circumferential direction C until peripheral portion 242 merges with belt cover 254. For example, louvers 260 may increase progressively from the transition point 276 to a maximum extension angle 262. According to exemplary embodiments, the maximum extension angle 262 may be between about 0 and 45 degrees, between about 5 and 35 degrees, between about 10 and 25 degrees, between about 15 and 20 degrees, or any other suitable angle. According to still other embodiments, the maximum extension angle 262 may be different between first portion 272 and second portion 274. In this regard, for example, the maximum extension angle 262 may vary depending on the operating characteristics or speeds of drive motor 204 in the agitation, spin, or other operating cycles.

In addition, it should be appreciated that the geometry of louvers 260 may vary, e.g., along the axial direction A. In this regard, louvers 260 may generally be curved to wrap around peripheral portion 252 from drive motor 204 toward endcap 250. The angle of curvature may be similar to the angle of curvature of peripheral portion 252. According to still other embodiments, louvers 260 may be straight fins, may be one or more aligned baffles, or may have any other suitable size, geometry, and/or configuration.

The motor assembly described above facilitates reduced temperature operation of the motor assembly throughout various operating cycles of a washing machine appliance. In this regard, the integral fan directs air flow away from the motor, thereby discharging heated air and cooling components proximate motor assembly. This in turn reduces or eliminates restrictions on the operating envelope of the motor assembly for improved power, performance, and efficiency. Moreover, reduced temperature operation results in prolonged life of the motor, fewer maintenance visits and replacement parts, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:
    a wash tub positioned within a cabinet and defining a wash chamber;
    a wash basket rotatably mounted within the wash tub for receiving of a load of articles for washing;
    an agitation element rotatably mounted within the wash basket;
    a drive motor having a motor shaft defining an axial direction and being operably coupled to the wash basket and the agitation element for selectively rotating the wash basket and the agitation element;
    a cooling fan mechanically coupled to the motor shaft for urging a flow of air as the drive motor rotates the motor shaft; and
    a fan cover positioned over the cooling fan, the fan cover comprising:
        an endcap positioned opposite the cooling fan relative to the drive motor along the axial direction;
        a peripheral portion defining a plurality of ventilation openings spaced apart along a circumferential direction; and
        a plurality of louvers positioned over the plurality of ventilation openings for directing the flow of air away from the drive motor, wherein each of the plurality of louvers defines an extension angle measured relative to a tangent line defined by the fan cover at a location of each of the plurality of louvers, wherein a transition point is defined on the peripheral portion of the fan cover, and wherein the extension angle changes from a clockwise orientation to a counterclockwise orientation at the transition point.

2. The washing machine appliance of claim 1, wherein each of the plurality of louvers is oriented in the same direction.

3. The washing machine appliance of claim 2, wherein each of the plurality of louvers defines an extension angle measured relative to a tangent line defined by the fan cover at a location of each of the plurality of louvers, wherein the extension angle of a first louver of the plurality of louvers is different than the extension angle of a second louver of the plurality of louvers.

4. The washing machine appliance of claim 1, wherein a magnitude of the extension angle for each of the plurality of louvers increases progressively from the transition point.

5. The washing machine appliance of claim 1, wherein each the plurality of louvers is defined on the peripheral portion of the fan cover.

6. The washing machine appliance of claim 5, wherein each the plurality of louvers is arcuate relative to the axial direction and curves at least partially around the peripheral portion of the fan cover.

7. The washing machine appliance of claim 1, wherein the endcap of the fan cover defines a plurality of endcap apertures.

8. The washing machine appliance of claim 1, wherein the fan cover defines a first portion and a second portion separated by a transition line that passes through a transition point.

9. The washing machine appliance of claim 8, wherein the first portion is a mirror image of the second portion.

10. The washing machine appliance of claim 1, further comprising a transmission assembly comprising:
    a drive pulley mechanically coupled to the motor shaft;
    an input shaft mechanically coupled to the wash basket and the agitation element;
    a drive belt mechanically coupling the input shaft to the motor shaft; and
    a belt cover that extends from the fan cover and is positioned over the drive belt.

11. The washing machine appliance of claim 10, wherein the belt cover defines a plurality of belt cover apertures for passing the flow of cooling air.

12. The washing machine appliance of claim 10, wherein the peripheral portion extends through an arc length measured along the circumferential direction before merging with the belt cover, the arc length being between about 195 and 315 degrees.

13. The washing machine appliance of claim 1, wherein the cooling fan is a centrifugal fan.

14. The washing machine appliance of claim 1, wherein the washing machine appliance is a top load washing machine appliance.

15. A fan cover for a washing machine appliance, the washing machine appliance comprising a wash basket rotatably mounted within a wash tub, an agitation element rotatably mounted within the wash basket, a drive motor having a motor shaft defining an axial direction and being operably coupled to the wash basket and the agitation element for selectively rotating the wash basket and the agitation element, and a cooling fan mechanically coupled to the motor shaft for urging a flow of air as the drive motor rotates the motor shaft, the fan cover comprising:
    an endcap positioned opposite the cooling fan relative to the drive motor along the axial direction;
    a peripheral portion defining a plurality of ventilation openings spaced apart along a circumferential direction; and
    a plurality of louvers positioned over the plurality of ventilation openings for directing the flow of air away from the drive motor, wherein each of the plurality of louvers defines an extension angle measured relative to a tangent line defined by the fan cover at a location of each of the plurality of louvers, wherein a transition point is defined on the peripheral portion of the fan cover, and wherein the extension angle changes from a clockwise orientation to a counterclockwise orientation at the transition point.

16. The fan cover of claim 15, wherein each of the plurality of louvers is oriented in the same direction.

17. The fan cover of claim 16, wherein each of the plurality of louvers defines an extension angle measured relative to a tangent line defined by the fan cover at a location of each of the plurality of louvers, wherein the extension angle of a first louver of the plurality of louvers is different than the extension angle of a second louver of the plurality of louvers.

18. The fan cover of claim 15, wherein a magnitude of the extension angle for each of the plurality of louvers increases progressively from the transition point.

* * * * *